(12) United States Patent
Kraemer et al.

(10) Patent No.: US 10,963,869 B2
(45) Date of Patent: Mar. 30, 2021

(54) SYSTEM AND METHOD OF CRYPTOGRAPHICALLY PROVABLE ZERO KNOWLEDGE SOCIAL NETWORKING

(71) Applicant: International Business Machines Corporation, Armonk, NY (US)

(72) Inventors: James R. Kraemer, Santa Fe, NM (US); Jeb R. Linton, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 15/209,834

(22) Filed: Jul. 14, 2016

(65) Prior Publication Data

US 2018/0019873 A1    Jan. 18, 2018

(51) Int. Cl.
 *G06Q 20/38* (2012.01)
 *H04L 9/32* (2006.01)
 (Continued)

(52) U.S. Cl.
 CPC .......... *G06Q 20/382* (2013.01); *G06Q 20/06* (2013.01); *G06Q 50/01* (2013.01); *H04L 9/0894* (2013.01); *H04L 9/3218* (2013.01); *H04L 51/32* (2013.01); *H04L 63/123* (2013.01); *H04L 67/1097* (2013.01); *H04L 67/141* (2013.01);
 (Continued)

(58) Field of Classification Search
 CPC ..... G06Q 20/00–425; G06Q 50/00–34; G06Q 2220/00–18; H04L 63/00–30; H04L 9/00–38; H04L 51/00–38; H04L 67/00–42; H04L 2209/00–88
 See application file for complete search history.

(56) References Cited

U.S. PATENT DOCUMENTS 9,210,201 B2 * 12/2015 Dale ...................... G06Q 50/01
9,449,282 B2 *  9/2016 Diaz ................... G06F 16/9535
(Continued)

OTHER PUBLICATIONS

Eli Ben-Sasson et al., TinyRAM Architecture Specification, 2013, URL: http://scipr-lab.org/tinyram (Year: 2013).*
(Continued)

*Primary Examiner* — Calvin L Hewitt, II
*Assistant Examiner* — Chenyuh Kuo
(74) *Attorney, Agent, or Firm* — Fleit Intellectual Property Law; Jose Gutman

(57) ABSTRACT

A social networking system, computer program product, and methods with a Personal Avatar executing on a first server node and a zero knowledge Arbiter executing on a second server node in a network of the social networking system. The Personal Avatar communicates social networking system messages in a communication session using a zero knowledge protocol with the zero knowledge Arbiter executing on the second server node operating in zero knowledge and using zero knowledge verifiable computing to enforce usage conditions on social networking system messages communicated in a communication session with the zero knowledge Arbiter. The zero knowledge Personal Avatar communicates social networking system messages in a communication session using a zero knowledge protocol with the zero knowledge Arbiter. The methods ensure privacy of an end user of the social networking system.

7 Claims, 8 Drawing Sheets

(51) Int. Cl.
   *H04L 12/58* (2006.01)
   *G06Q 50/00* (2012.01)
   *G06Q 20/06* (2012.01)
   *H04L 9/08* (2006.01)
   *H04L 29/08* (2006.01)
   *H04L 29/06* (2006.01)

(52) U.S. Cl.
   CPC ....... *H04L 67/143* (2013.01); *G06Q 2220/00* (2013.01); *H04L 67/38* (2013.01); *H04L 2209/38* (2013.01)

(56) References Cited

U.S. PATENT DOCUMENTS

| | | | | |
|---|---|---|---|---|
| 9,686,356 | B2* | 6/2017 | Raduchel | G06F 21/6263 |
| 2002/0147604 | A1* | 10/2002 | Slate, II | G06Q 50/182 |
| | | | | 705/64 |
| 2011/0138454 | A1 | 6/2011 | Mansour | |
| 2012/0084348 | A1* | 4/2012 | Lee | G06Q 30/0241 |
| | | | | 709/203 |
| 2012/0303535 | A1* | 11/2012 | Guest, III | G06Q 10/10 |
| | | | | 705/80 |
| 2014/0080559 | A1* | 3/2014 | Knutsson | G07F 17/32 |
| | | | | 463/10 |
| 2014/0196140 | A1 | 7/2014 | Gong | |
| 2015/0066867 | A1 | 3/2015 | Vronay et al. | |

OTHER PUBLICATIONS

Eli Ben-Sasson et al., Succinct non-interactive zero knowledge for a von Neumann architecture. In Proceedings of the 23rd USENIX Security Symposium, San Diego, CA, USA, Aug. 20-22, 2014, pp. 781-796, 2014 (Year: 2014).*

Eli Ben-Sasson et al., On the Concerte Efficiency of Probabilistically-Checkable Proofs, Dec. 28, 2012, Electronic Colloquium on Computational Complexity, Revision 3 of Report No. 45 (2012) (Year: 2012).*

Dolev, S., et al., "Brief Announcement: Rationality Authority for Provable Rational Behavior", Proceedings of the 30th Annual ACM Symposium on Principles of Distributed Computing, Jun. 6-8, 2011, pp. 1-2.

Bhargav-Spantzel, A. et al., "Multifactor Identity Verification Using Aggregated Proof of Knowledge", IEEE Transactions on Systems, Man, and Cybernetics—Part C: Applications and Reviews, Jul. 2010, pp. 1-12, vol. 40, No. 4.

U.S. Appl. No. 14/752,230, filed Jun. 26, 2015.

U.S. Appl. No. 14/858,389, filed Sep. 18, 2015.

Jagwani, P., et al., "Defending Location Privacy using Zero Knowledge Proof Concept in Location Based Services", Proceedings of the 2012 13th IEEE International Conference on Mobile Data Management, Jul. 23-26, 2012, pp. 1-4.

* cited by examiner

SYSTEM AND METHOD OF CRYPTOGRAPHICALLY PROVABLE ZERO KNOWLEDGE SOCIAL NETWORKING

BACKGROUND

The present invention generally relates to cloud services, zero knowledge cryptography, and social networking systems and methods, and more particularly to a social networking system that allows users to use the system while maintaining privacy of the users' personal information.

Social networking systems normally maintain user sensitive personal information stored in a central repository of an information processing system. Large social networking systems can be implemented over wide area networks and on cloud systems using cloud services. Users of the social networking system trust that their personal information will not be accessed or disclosed without the user's permission. Users require strong assurance against unauthorized access and disclosure of their sensitive personal information.

Unfortunately, user's personal information stored in such central repository of a social networking system as of late has become more susceptible to being hacked and disclosed without permission. One example of unauthorized access and disclosure of user personal information is the Ashley Madison online dating service scandal, which resulted in compromised sensitive and intimate or embarrassing personal information for many members of the dating service. The Ashley Madison compromise of user information is just one of a growing list of exposures of personal information due to hacks and insider attacks that have been high-profile in the news.

There is a need for stronger privacy and security of user's personal information in social networking systems.

BRIEF SUMMARY

According to various embodiments, disclosed is a cryptographically assured distributed private cloud and social networking system, providing zero knowledge assurance of end user personal information protection and privacy. This cryptographic zero knowledge operation assures both integrity for the social networking system and privacy for the end users of the social networking system. Further, various embodiments disclosed enable the creation of zero knowledge social networking systems which can provide both the cryptographic assurance of information control and system integrity required by social networking system operators and service providers to monetize their system free of piracy and hacking, and a strong guarantee of privacy for end users of the social networking system.

The present disclosure according to various embodiments thereof, provides a new and novel computer-based method for social networking messaging communication between a server node in a zero knowledge social networking system and an end user device, ensuring privacy of an end user using the end user device. The method comprises: executing, with an end user device, at least a portion of a social networking system Personal Device application using a zero knowledge protocol in a communication session with a server node of a social networking system, the zero knowledge protocol maintaining privacy of an end user while using the at least a portion of the social networking system Personal Device application to communicate messages in the social networking system, the end user's privacy maintained with respect to the zero knowledge social networking system and with respect to other end users thereof; initiating, with the at least a portion of the social networking system Personal Device application executing at the end user device, a communication session using a zero knowledge protocol between the end user device and the server node operating in zero knowledge; transmitting, with the at least a portion of the social networking system Personal Device application executing on the end user device in the communication session using the zero knowledge protocol, at least a portion of a social networking system message destined for reception by a server side zero knowledge Personal Device application service running on the server node, while maintaining the privacy of the end user of the social networking system Personal Device application executing on the end user device with respect to the zero knowledge social networking system and with respect to other end users thereof, the server side zero knowledge Personal Device application service using zero knowledge verifiable computing to communicate social networking system messages between the server side zero knowledge Personal Device application service and the at least a portion of the social networking system Personal Device application running on the end user device; receiving, with the at least a portion of the social networking system Personal Device application executing on the end user device in the communication session using the zero knowledge protocol, a response message sent from the zero knowledge Personal Device application service and destined for reception by the social networking system Personal Device application executing on the end user device, the response message including an indication of whether the zero knowledge Personal Device application service has successfully executed the at least a portion of the social networking system message at the server node; and based upon the response message including an indication indicating a successful execution, continuing in the communication session between the zero knowledge Personal Device application service running on the server node and the social networking system Personal Device application executing on the end user device; and otherwise terminating the communication session.

In one example, disclosed is a computer-based method with a first zero knowledge Personal Avatar executing on a first server node operating in zero knowledge in a network of a social networking system for communicating social networking system messages with the first zero knowledge Personal Avatar, while ensuring privacy of an end user with respect to the social networking system and with respect to other end users of the social networking system while the end user is using a social networking system Personal Device application executing on an end user device in a communication session using a zero knowledge protocol between the social networking system Personal Device application and the first zero knowledge Personal Avatar executing on the first server node operating in zero knowledge, wherein the social networking system comprising at least one zero knowledge Arbiter executing on a second sever node of the social networking system. The method comprises: publicizing, with the first zero knowledge Personal Avatar in the social networking system network, via a registry readable by one or more information processing systems other than the first server node and communicatively coupled with the social networking system network, that the first zero knowledge Personal Avatar is available for communicating social networking system messages in the social networking system while using a zero knowledge protocol in a communication session with the first zero knowledge Personal Avatar executing on the first server node operating in zero knowledge; receiving, at the first zero knowledge Personal Avatar executing on the first server node while operating in zero knowledge, a connection request transmitted from a second zero knowledge Personal Avatar executing on a third server node while operating in zero knowledge in the network of the social networking system; initiating, based on the received connection request and with the first zero knowledge Personal Avatar executing on the first server node operating in zero knowledge, a communication session using a zero knowledge protocol between the first zero knowledge Personal Avatar and the zero knowledge Arbiter executing on the second sever node of the social networking system operating in zero knowledge, the zero knowledge Arbiter operating in zero knowledge and using zero knowledge verifiable computing to enforce usage conditions on the social networking system messages communicated in the communication session between one or more of the social networking system Personal Device application executing on the end user device, the first zero knowledge Personal Avatar executing on the first server node operating in zero knowledge, and the zero knowledge Arbiter executing on the second server node operating in zero knowledge; receiving, with the first zero knowledge Personal Avatar running on the first server node operating in zero knowledge while in the communication session using the zero knowledge protocol with the zero knowledge Arbiter, at least a portion of a first social networking system message in the communication session, the first social networking system message including a request for personal identification information of the end user, the personal identification information of the end user comprising at least one of: gender, gender preference, age, age preference, a picture of the end user, a set of preferences of the end user, and a set of attributes or characteristics of the end user, the first social networking system message being destined for reception by the first zero knowledge Personal Avatar running on the first server node, while maintaining the privacy of the end user of the social networking system Personal Device application running on the end user device with respect to the zero knowledge social networking system and with respect to other end users thereof; transmitting, with the first zero knowledge Personal Avatar running on the first server node operating in zero knowledge while in the communication session using the zero knowledge protocol with the zero knowledge Arbiter operating in zero knowledge, at least a portion of a second social networking system message in the communication session, the second social networking system message including a first response from the first zero knowledge Personal Avatar, the first response including the requested personal identification information of the end user; and receiving, with the first zero knowledge Personal Avatar running on the first server node operating in zero knowledge while in the communication session using the zero knowledge protocol with the zero knowledge Arbiter, at least a portion of a third social networking system message in the communication session, the third social networking system message including a second response from the zero knowledge Arbiter, the second response including an indication indicating that the zero knowledge Arbiter has successfully executed the first response.

In one example, a payment is received from the end user device by a social networking system network server node, as payment for a social networking system service provided to the end user. Such payment can be in a cryptocurrency, such as bitcoin.

Furthermore, according to various embodiments, disclosed is a non-transitory computer program product for communicating social networking system messages with a first zero knowledge Personal Avatar executing on a first server node operating in zero knowledge in a network of a social networking system. An end user's privacy is ensured with respect to the social networking system and with respect to other end users of the social networking system while the end user is using a social networking system Personal Device application executing on an end user device in a communication session using a zero knowledge protocol between the social networking system Personal Device application and the first zero knowledge Personal Avatar executing on the first server node operating in zero knowledge. The social networking system can include at least one zero knowledge Arbiter executing on a second sever node of the social networking system. The non-transitory computer program product comprises a computer readable storage medium having computer readable program code embodied therewith. The computer readable program code includes computer instructions, where a processor, responsive to executing the computer instructions, performs operations comprising: publicizing, with the first zero knowledge Personal Avatar in the social networking system network, via a registry readable by one or more information processing systems other than the first server node and communicatively coupled with the social networking system network, that the first zero knowledge Personal Avatar is available for communicating social networking system messages in the social networking system while using a zero knowledge protocol in a communication session with the first zero knowledge Personal Avatar executing on the first server node operating in zero knowledge; receiving, at the first zero knowledge Personal Avatar executing on the first server node while operating in zero knowledge, a connection request transmitted from a second zero knowledge Personal Avatar executing on a third server node while operating in zero knowledge in the network of the social networking system; initiating, based on the received connection request and with the first zero knowledge Personal Avatar executing on the first server node operating in zero knowledge, a communication session using a zero knowledge protocol between the first zero knowledge Personal Avatar and the zero knowledge Arbiter executing on the second sever node of the social networking system operating in zero knowledge, the zero knowledge Arbiter operating in zero knowledge and using zero knowledge verifiable computing to enforce usage conditions on the social networking system messages communicated in the communication session between one or more of the social networking system Personal Device application executing on the end user device, the first zero knowledge Personal Avatar executing on the first server node operating in zero knowledge, and the zero knowledge Arbiter executing on the second server node operating in zero knowledge; receiving, with the first zero knowledge Personal Avatar running on the first server node operating in zero knowledge while in the communication session using the zero knowledge protocol with the zero knowledge Arbiter, at least a portion of a first social networking system message in the communication session, the first social networking system message including a request for personal identification information of the end user, the personal identification information of the end user comprising at least one of: gender, gender preference, age, age preference, a picture of the end user, a set of preferences of the end user, and a set of attributes or characteristics of the end user, the first social networking system message being destined for reception by the first zero knowledge Personal Avatar running on the first server node, while maintaining the privacy of the end user of the social networking system Personal Device application running on the end user device with respect to the zero knowledge social networking system and with respect to other end users thereof; transmitting, with the first zero knowledge Personal Avatar running on the first server node operating in zero knowledge while in the communication session using the zero knowledge protocol with the zero knowledge Arbiter operating in zero knowledge, at least a portion of a second social networking system message in the communication session, the second social networking system message including a first response from the first zero knowledge Personal Avatar, the first response including the requested personal identification information of the end user; and receiving, with the first zero knowledge Personal Avatar running on the first server node operating in zero knowledge while in the communication session using the zero knowledge protocol with the zero knowledge Arbiter, at least a portion of a third social networking system message in the communication session, the third social networking system message including a second response from the zero knowledge Arbiter, the second response including an indication indicating that the zero knowledge Arbiter has successfully executed the first response.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
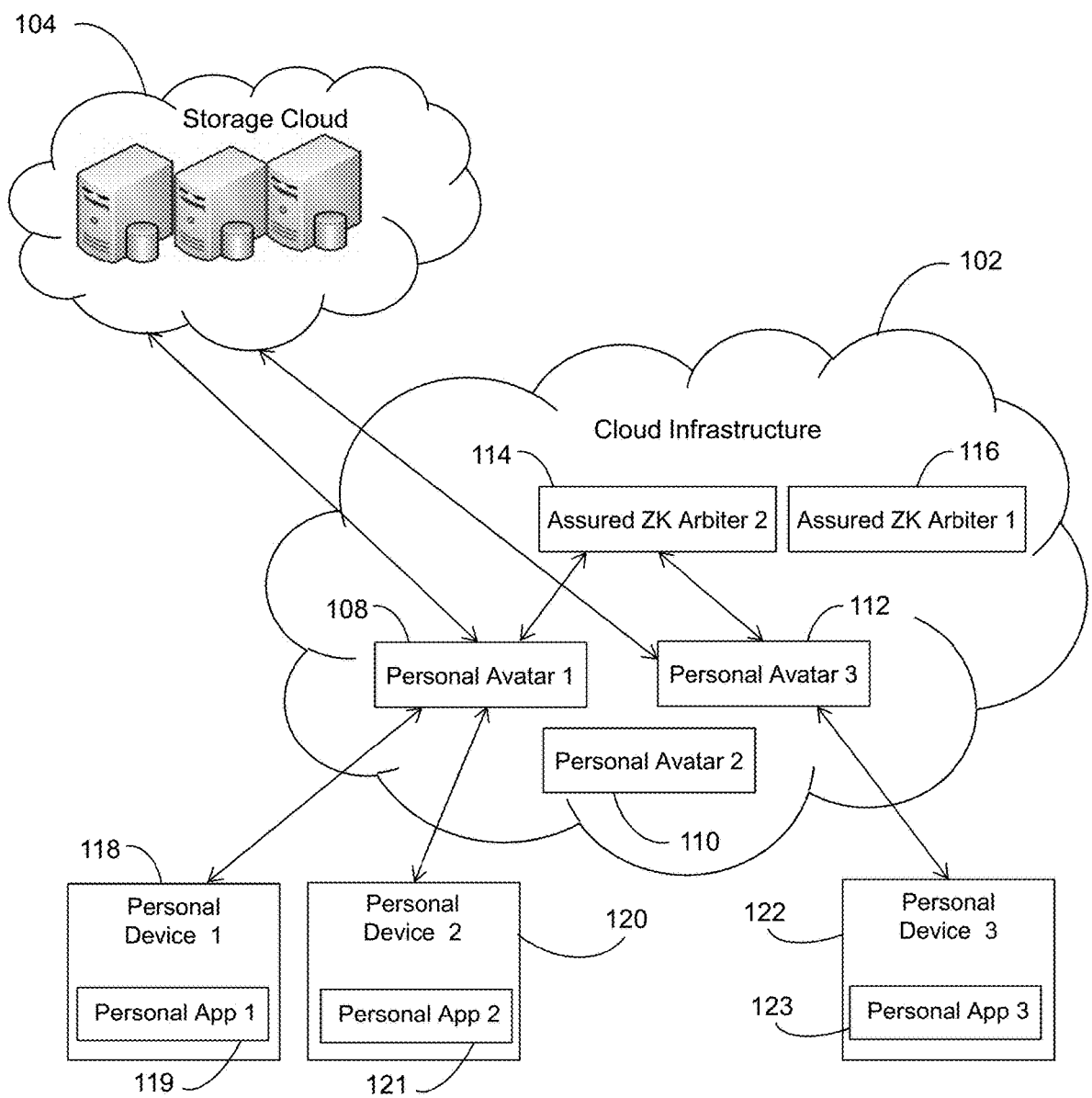
FIG. 1 is a block diagram illustrating an example of a social networking system dating service deployed over a cloud infrastructure with end users and consumers demanding privacy, according to an embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

According to various embodiments of the present disclosure, provided is an information processing system, using recent advances in Zero Knowledge Cryptography, capable of replicating the features of existing social networks such as Facebook, LinkedIn, and various dating services, without the need for a central trusted repository of sensitive personal information that can be subject to unwanted disclosure through hacking or compromise by an insider. All of the principal functions of social networking system communication can now be implemented in zero knowledge, and optionally in provable zero knowledge, as will be discussed below.

More specifically, a Personal Avatar cloud service (also referred to as a Personal Avatar) together with a Personal Device application, which together contain all personal information relating to a user (end user) and which interact with other users' Personal Avatar and Personal Device application by way of one or more cryptographically assured zero knowledge ("ZK") Arbiters. The Personal Avatar can include any one or more of the following: a cloud-resident application, a virtual machine, or a container-based program, and which interacts with other users' Personal Avatars in order to make, suggest, and manage person to person connections. A "Person" in this context may represent actual persons but may also include representations of corporations or other multi-person organizations, such as are often used in existing social networks. According to various alternative embodiments, a Personal Avatar can comprise cloud-resident avatars or Personal Device applications which embody all the features of both the above mentioned Personal Avatars and Personal Device applications. Additionally, a Personal Avatar can connect to a Zero Knowledge (ZK) Personal Avatar service that operates a Personal Avatar in zero knowledge. In this way, the ZK Personal Avatar embodies the Personal Avatar operating in zero knowledge. A Personal Avatar connects to a ZK Personal Avatar and checks their integrity preferably ahead of time of use by a user. According to various alternative embodiments, the terms Personal Avatar and ZK Personal Avatar can be used interchangeably to mean any configuration of the Personal Avatar, the ZK Personal Avatar, or the Personal Avatar connected to a ZK Personal Avatar, as mentioned above, and that can operate in zero knowledge, according to the context of the particular example being discussed herein.

The Personal Avatar, according to the present example, operates in zero knowledge because at least the server nodes on which the Personal Avatar executes on store no session information from a communication session with other server nodes in the social networking system network, and store no session information from a communication session with the end user device. The server nodes also store no information identifying the specific end user of the end user device, and no IP address of the specific end user device that is operating in the social networking system. That is, the end user device, e.g., executing a Personal Device application on the end user device, can securely and privately interact with the server nodes operating in zero knowledge in the social networking system, while the Personal Device application executing on the end user device is in a communication session using a zero knowledge protocol with the server nodes.

A cryptographically assured zero knowledge ("ZK") Arbiter, which may be alternatively also referred to as a ZK Arbiter or as a provable ZK Arbiter, according to various embodiments, comprises one or more cryptographically assured ZK cloud services that can include any one or more of the following: a cloud-resident application, a virtual machine, or a container-based program. The cryptographically assured ZK Arbiter interacts with users' Personal Avatars as a trusted intermediary in order to facilitate, while operating in zero knowledge, the making, suggesting, and managing of person to person connections by the respective users' Personal Avatars. The ZK Arbiter can be proven (e.g., cryptographically verifiable proof of integrity) using SCIP or another Probabilistically Checkable Proof (PCP), and can perform a version of the "zero knowledge dating card trick".

According to the present discussion, the terms Assured or Cryptographically Assured are intended to broadly mean either: 1) Cryptographically provable (verifiable) proof of integrity using one of various forms of Probabilistically Checkable Proof, 2) Assured through implementation of Trusted Computing, or 3) a combination of the two above listed methods of operation.

The term "cryptocurrency" is used to mean a medium of exchange using cryptography to secure the transactions and to control the creation of new units. Cryptocurrencies are a subset of alternative currencies, or specifically of digital currencies. Bitcoin is an example.

The phrase "destined for reception" is intended to broadly describe a set of one or more communication units, such as message packets or chunks, transmitted in a communication network and including identification of a destination at an information processing system communicatively coupled with the communication network. Such identification can include, but is not limited to, an address information and/or a header information that identifies the destination at the information processing system to a component of the communication network to assist in delivering the set of one or more communication units to the destination at the information processing system through communication in the communication network. A non-limiting example of use of this phrase is the following: "at least a portion of a message transmitted by the server node and destined for reception at the end user device".

The phrases "operating in zero knowledge" or "operate in zero knowledge", or the like, are intended to describe a method of operation of a social networking system network, which performs transactions which use, communicate, and store no information beyond the minimum intended or required to be used, communicated, or stored for the transaction to be successful. Communications to and from each server node contain no information not needed to perform the transaction, and each such server node stores: 1) no session information from a communication session with an end user device, 2) no information identifying the specific end user requesting particular social networking system information from the server node, and 3) no IP address of the specific end user device that requested and downloaded the particular social networking system information.

The phrase "verifiable computing" in cryptography, is a method by which one party, the prover, or as may be also used in this patent a "user" or an "end user", can prove to another party, the verifier, or as may be also used in this disclosure a "social networking system service provider" or "service provider", providing social networking system services that a program (e.g., an application on the end user device, a Personal Device application, or a Personal Avatar, or a zero knowledge Arbiter) has been or is being executed correctly and without modification or tampering.

The phrase "zero knowledge verifiable computing" is a method of verifiable computing which can also function as a zero knowledge protocol. Examples of zero knowledge verifiable computing are a succinct computational integrity and privacy (SCIP) technique, a zero knowledge succinct non-interactive argument of knowledge (zk-snark) technique, and a zero knowledge protocol is a probabilistically checkable proof (PCP) technique.

A "zero knowledge protocol", in cryptography, is a method by which one party, the prover, or as may be also used in this disclosure a "user" or an "end user", can prove to another party, the verifier, or as may be also used in this disclosure a "social networking system service provider" or "service provider" providing social networking system services that a given statement is true, without conveying any information apart from the fact that the statement is indeed true.

The terms "zero knowledge social networking system", "zero knowledge social networking system network", or "ZK social networking system network", or "ZK social networking system", or the like, are intended to broadly define a social networking system network where each server node that delivers message communication between end user devices operates in zero knowledge.

This disclosure makes use of zero knowledge cloud service technology described in related U.S. patent application Ser. No. 15/080,678, filed on Mar. 25, 2016, with the title "Cryptographically Assured Zero Knowledge Cloud Service For Composable Atomic Transactions", the entire disclosure of which being hereby incorporated by reference. The availability of a particular ZK Arbiter and particular Personal Avatars may be advertised (publicized) using for example a Distributed Registry similar to that described in U.S. patent application Ser. No. 14/752,230, filed on Jun. 26, 2015, the entire disclosure of which being hereby incorporated by reference; or similar to any scalable registry of available cloud services. Examples of integrated cryptocurrency payment for services are described in U.S. patent application Ser. No. 14/858,389, filed on Sep. 18, 2015, the entire disclosure of which being hereby incorporated by reference.

According to an example system implementation, if two Personal Avatars connect and then want to operate in zero knowledge for enhanced privacy, they can share a list of ZK Arbiters that they have in common in order to interact. If no ZK Arbiteris in common, a new ZK Arbiter is selected for example using a protocol such as one of the following:

1) The Personal Avatar that didn't initiate the link picks one and the initiator connects to it and checks integrity and they use that one.

2) Alternatively, each Personal Avatar suggests one ZK Arbiter and then they both prove the ZK Arbiter that the other suggested.

3) As another alternative procedure, one Personal Avatar selects a ZK Arbiter from the common list of ZK Arbiters by assigning sequential list item numbers in the common list to each ZK Arbiter on the list, and selecting the number that is a remainder of: ((a first random number from the list of item numbers selected by one Personal Avatar)+(a second random number from the list of item numbers selected by the other Personal Avatar))–(the total number of ZK Arbiters in the common list if the sum of the first two terms is greater than the number of ZK Arbiters in the common list).

One example implementation of a social networking system can advertise (publicize) availability of Personal Avatars and ZK Arbiters by a Distributed Registry similar to that described in U.S. patent application Ser. No. 14/752,230. The social networking interface application on the end user device and the end user's Personal Device application can additionally use anonymizing proxies to further enhance their privacy in the social networking system. According the present example, all the services (e.g., Personal Avatar, ZK Arbiter, Distributed Registry, and a social networking system) can be made available through a peer-to-peer cloud network architecture.

Further, according to the present example, a user's Personal Device application stores the user's personal information and the key to the user's Personal Avatar, which all this information is stored encrypted and unlockable through existing device security.

According to various embodiments of the present disclosure, a social networking system and method, such as a dating service, can maintain privacy of the users through zero knowledge operation of the social networking system servers, while communications are delivered between end users over the social networking system dating service, and without compromising end user privacy. That is, various embodiments according to the present disclosure provide both secure and efficient delivery of messages and information between end users over a social networking system while also maintaining end user privacy. The end users can remain anonymous to each other, and can remain anonymous to the social networking system dating service.

This is accomplished, according to various embodiments, using cryptographically assured distributed private cloud and zero knowledge assurance. This cryptographic zero knowledge operation of the social networking system servers in a social networking system dating service assures both security and integrity of communications between end users as well as privacy for the end users; and may be optionally integrated with cryptocurrency smart contracts, or similar technologies to facilitate the basic operations of the social networking system with its end users, and a strong guarantee of privacy for end users and service consumers.

Using similar techniques for Probabilistically Checkable Proof (PCP) and Zero Knowledge (ZK) proof, various embodiments of the invention comprise an Assured (Trusted, optionally Provable through Probabilistically Checkable proofs) Zero Knowledge (ZK) Social Networking System, i.e., operating in zero knowledge (e.g., without storing a record of which message communication was delivered to what end user at any given time).

Two example network mechanisms are disclosed as follows.

1. A Zero Knowledge server advertises (publicizes) availability of Personal Avatars for a dating service, optionally stored in encrypted form, which is delivered to end user without storing information regarding the transaction, or stored only in secure form using "break-glass" security which allows for recovery of the transaction history under strictly controlled circumstances such as a subpoena and with cooperation of the social networking system service provider. Such Personal Avatars and Personal Devices may set up connections using Network Address Translation (NAT) dynamically configured in the network equipment to prevent trivial network traffic analysis from determining which message communication was delivered to which end user at which time. This method allows the Zero Knowledge server to operate with less CPU resources simply by setting up an ephemeral NAT session on the network equipment and delivering the messages to the perceived IP address of the consumer without storing session state, or storing state only using a break-glass method as will be more fully discussed below.

2. Zero Knowledge server software passes the message communications to the end user's actual IP address while operating in zero knowledge, without recording session activity or recording it only within the context of a "break glass" system that allows discovery of session log data only under strictly controlled circumstances as described above.

In each example case listed above, a Personal Device service may comprise a provable or attested program which the Zero Knowledge server checks for validity using either PCPs or Trusted Computing. Social networking system messages may be stored and delivered in encrypted form with a shared key, or in encrypted form using a unique key per end user.

The availability of a particular Personal Avatar of an end user may be advertised (publicized) using a Distributed Registry similar to that described in U.S. patent application Ser. No. 14/752,230, filed on Jun. 26, 2015, the entire disclosure of which being hereby incorporated by reference; or similar to any scalable registry of available applications and services. Personal Avatars may use Public Key Infrastructure (PKI) to sign messages in order to prevent illegitimate messages from being distributed in their names; a Zero Knowledge server, a Personal Avatar, or a ZK Arbiter, would be able to check these signatures for received message validity and integrity prior to use. Users may join the social networking system dating service, for example, by making secure and private payments to the service provider. Examples of integrated cryptocurrency payment for services are described in U.S. patent application Ser. No. 14/858,389, filed on Sep. 18, 2015, the entire disclosure of which being hereby incorporated by reference. Examples of management and monetization of information delivery (e.g., social networking system message delivery) services are described in U.S. patent application Ser. No. 14/970,966, filed on Dec. 16, 2015, the entire disclosure of which being hereby incorporated by reference.

Social Networking System Network Topology

Referring to the example shown in FIG. 1, a social networking system cloud infrastructure (also referred to as a social networking system) 102 comprises a first assured ZK Arbiter 116 and a second assured ZK Arbiter 114, according to the present example. There are also three Personal Avatars in the cloud infrastructure 102. The first Personal Avatar 108 is communicatively coupled with a first Personal Device 118 and a second Personal Device 120. In this example, a Personal Device is embodied, at least in part, in an end user device. The first Personal Device 118 includes a first personal application 119 for interfacing with the social networking system 102. The second Personal Device 120 includes a second personal application 121 for interfacing with the social networking system 102. A user may use the first Personal Device 118 and the second Personal Device 120. That is, for example, the first Personal Device 118 may comprise an end user device such as a mobile phone while the second Personal Device 120 may comprise an end user device such as a tablet computer. The user (end user) may use the mobile phone at times, while the user may use the tablet computer at other times, to access the social networking system 102. Of course, the user may use both Personal Devices 118, 120, contemporaneously. Both Personal Devices 118, 120, are communicatively coupled with the same first Personal Avatar 108. In this example, a third Personal Avatar 112 is communicatively coupled with a third Personal Device 122 with a third Personal Device application 123 running on the third Personal Device 122 for interfacing with the social networking system 102.

The Personal Device application, according to various embodiments, is executed at the end user device using zero knowledge protocol with the server node operating in zero knowledge to ensure the privacy of the end user, with respect to the zero knowledge social networking system network. This effectively anonymizes end user communications of social networking system messages in the social networking system network, thereby enhancing the privacy of the end users and consumers.

The integrity and security of the end user communications of social networking system messages in the social networking system network is maintained through one or more of the following: secure message distribution (e.g., using DRM and cryptography to guard against piracy and hacking to ensure social networking system usage conditions are met), zero knowledge verifiable computing, and zero knowledge protocol to provide probabilistically checkable proof (PCP) that a program (e.g., a Personal Device application executing on an end user device in a communication session in the social networking system network, a Personal Avatar executing on a server node in the social networking system network, and a ZK Arbiter executing on a server node in the social networking system network) has been or is being executed correctly and without modification or tampering.

In zero knowledge verifiable computing, proving the program being executed on the particular server node or end user device on one side of a communication session to the respective server node or end user device on the other side of the communication session requires knowledge of some secret information on the part of the server node or end user device on the one side of the communication session, which the server node or end user device on the other side of the communication session will not be able to prove the statement in turn to anyone else, since the server node or end user device on the other side of the communication session do not possess the secret information. Notice that the program being proved must include the assertion that the server node or end user device on the one side of the communication session has such knowledge otherwise, the statement would not be proved in zero knowledge, since at the end of the zero knowledge protocol the server node or end user device on the other side of the communication session would gain the additional information of knowledge of the required secret information. If the statement consists only of the fact that the server node or end user device on the one side of the communication session possesses the secret information, it is a special case known as zero knowledge proof of knowledge, and it nicely illustrates the essence of the notion of zero knowledge proofs: proving that one has knowledge of certain information is trivial if one is allowed to simply reveal that information; the challenge is proving that one has such knowledge without revealing the secret information or anything else.

The cloud infrastructure 102, according to the present example, is communicatively coupled with a storage cloud 104. The various services and applications operating in the cloud infrastructure 102 can use the storage cloud 104 to store information used by the services and applications. For example, as shown in FIG. 1, the first Personal Avatar 108 and the third Personal Avatar 112 are communicatively coupled with the storage cloud 104. Each of these Personal Avatars 108, 112, stores information in the storage cloud 104.

Cryptographically Assured Personal Device Application

A Personal Device application in which social networking system messages can be communicated is created which allows for the Personal Device application to perform only the services allowed by the social networking system service operator. For example, the permitted services typically are to communicate social networking system messages a specified period or number of uses, or to allow the use of a Personal Device application with access only to certain data and services for a specified time period, number of uses, or based on other constraints. This Personal Device application can be compiled using SCIP, or a similar method of cryptographically verifiable proof of integrity against tampering and screen capture, and the proof of assured execution is recorded. This may be done once, with the proof provided to the social networking system service provider and to the end user along with a cryptographic hash of the Personal device application, both hash and proof of assurance made public on a peer to peer fabric or otherwise.

Alternatively or additionally it can be performed at the time of the Personal Device application executing on the end user device and communicating social networking system messages. The proof, which may include interactive proof whereby the Personal Device application proves correct operation continually as it executes, and not just at successful termination, together with proof of successful program exit parameters, and more is made available both to the social networking system service provider and to the end user to ensure compliance with the terms of a smart contract. On termination or alternatively at time of initial stage execution when the Personal device application is initiated, or continually as the application executes, the smart contract can be at least partially fulfilled and a cryptocurrency smart contract transaction is completed based on the output of the application and accompanying assurance proof. The cryptocurrency transaction concludes in zero knowledge, providing three-way anonymity/privacy between the end user and consumer, the social networking system service provider, and automated social networking system communication verification broker parties. According to the smart contract execution if the Personal device application fails, the cryptocurrency transaction does not complete, and if the cryptocurrency transaction fails, the authorization of the Personal device application fails.

The result is use or consumption of a Personal device application executed or played, and paid for through cryptocurrency capable of supporting basic two-way and three-way smart contract digital transactions make it cryptographically infeasible to use the Personal device application in the social networking system without paying, to gain payment without providing the requested service, and for either party to gain information about the other.

Cryptographically Trusted Base Platform

Additionally, it is possible to include in the Personal Device application parameters and tests to ensure that received social networking system messages are accessed only on assured workstations, mobile devices, etc., even to specifying maximum display resolution, acceptable device types and number of screens, geography (if a reliable source of this information is available through the executing device) or any other specifications—all the preceding of which can be tested by the Personal Device application using trusted computing and/or secure boot attestation of the end user device in addition to the Personal Device application itself. In this case, the Personal Device application performs a standard trusted computing group-style attestation of the base platform end user device on which the Personal Device application is to be run, and fails to execute if the base platform is in an untrusted state. Even more robust assurance against tampering can be provided by requirement of an end user device with specific protections against real-time tampering in memory such as those available in Intel SGX or IBM Power ACM or similar architectures.

Example of Social Networking System Server Node

Figure 7:
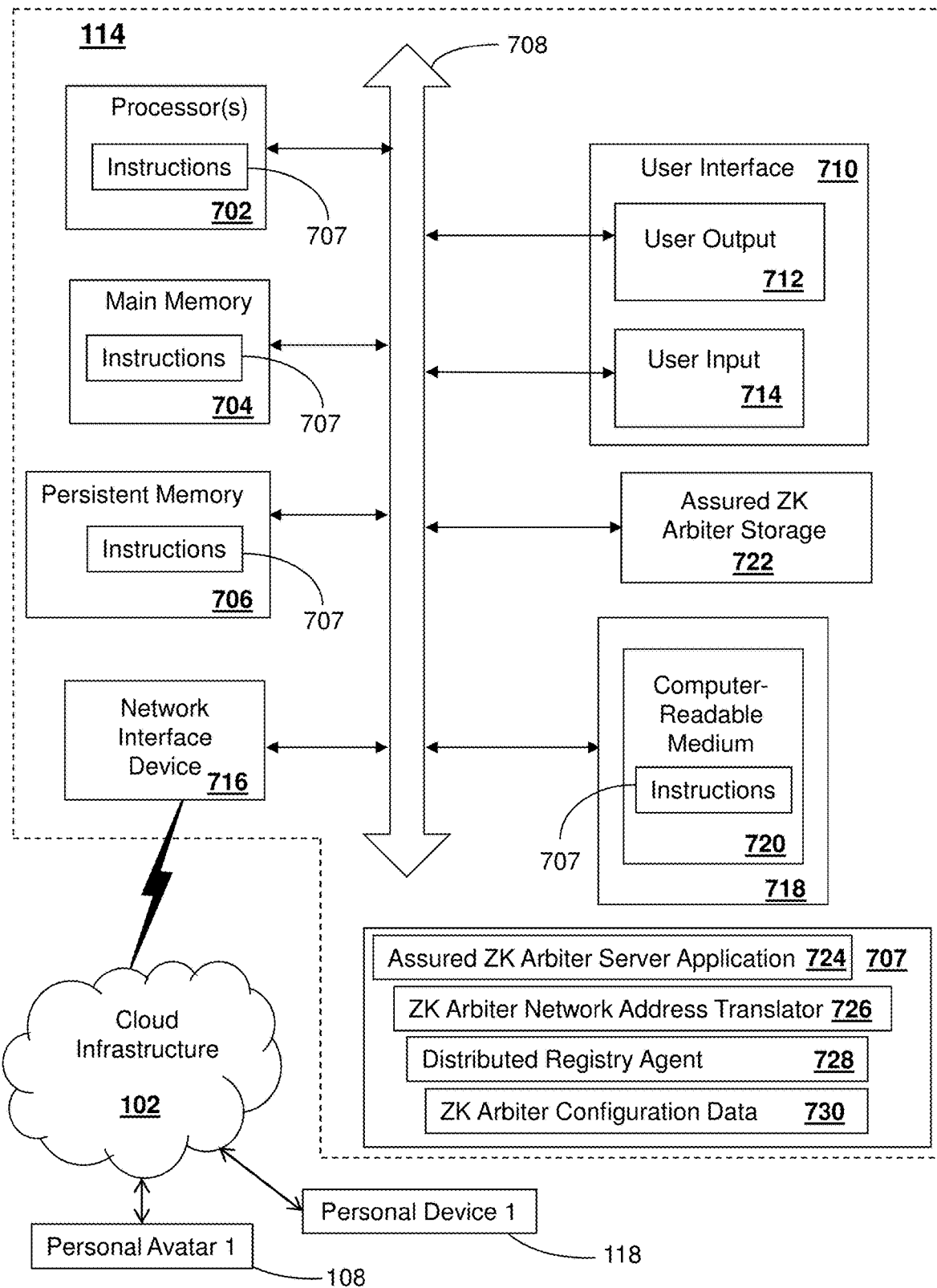
FIG. 7 is a block diagram illustrating an example of an assured zero knowledge Arbiter operating in a social networking system dating service, in accordance with an embodiment of the present invention.

FIG. 7 illustrates an example of the social networking system server node (or also referred to as server node or as zero knowledge server node) 114 in the social networking system network 102 as shown in FIG. 1. This simplified example is not intended to suggest any limitation as to the scope of use or function of various embodiments of the invention described herein. In the server node 114 there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Referring to FIG. 7, a more detailed view of an example cloud infrastructure server node embodying the assured ZK Arbiter 114 of FIG. 1 is shown. At least one processor 702 is communicatively coupled with system main memory 704 and persistent memory 706.

A bus architecture 708 facilitates communicatively coupling between the at least one processor 702 and the various elements of the assured ZK Arbiter 114. The bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system main memory 704, in one embodiment, can include computer system readable media in the form of volatile memory, such as random access memory (RAM) and/or cache memory. The ZK Arbiter computer system/server 114 may further include other removable/non-removable, volatile/non-volatile computer system storage media. By way of example only, a persistent memory storage system 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 208 by one or more data media interfaces. As will be further depicted and described below, persistent memory 706 may include at least one program product having a set (e.g., at least one) of program modules that are configured to carry out the functions of various embodiments of the invention.

Program/utility, having a set (at least one) of program modules, may be stored in persistent memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the invention as described herein.

The at least one processor 702 is communicatively coupled with one or more network interface devices 716 via the bus architecture 708. The network interface device 716 is communicatively coupled with the network 102. The network interface device 716 can communicate with one or more networks such as a local area network (LAN), a general wide area network (WAN), and/or a public network (e.g., the Internet). The end user device 118, for example, can also be communicatively coupled with the social networking system network 102 as shown. In this way, for example, the Personal Device application 119 executing on the end user device 118 can communicate with the server nodes 108 and 114, via the network interface device 716. The network interface device 716 facilitates communication between the ZK Arbiter 114 and the server nodes in the cloud infrastructure social networking system 102, which is communicatively coupled with Personal Avatars 108, 110, 112, and Personal Devices 118, 120, 122. For example, the second ZK Arbiter 114 can be communicatively coupled with the first Personal Avatar 108 and thereby communicatively coupled with the first Personal Device 118 and the second Personal Device 120, as shown in FIG. 7.

A user interface 710 is communicatively coupled with the at least one processor 702, such as via the bus architecture 708. The user interface 710, according to the present example, includes a user output interface 712 and a user input interface 714. Examples of elements of the user output interface 712 can include a display, a speaker, one or more indicator lights, one or more transducers that generate audible indicators, and a haptic signal generator. Examples of elements of the user input interface 714 can include a keyboard, a keypad, a mouse, a track pad, a touch pad, a microphone that receives audio signals. The received audio signals, for example, can be converted to electronic digital representation and stored in memory, and optionally can be used with voice recognition software executed by the processor 702 to receive user input data and commands.

A computer readable medium reader/writer device 718 is communicatively coupled with the at least one processor 702. The reader/writer device 718 is communicatively coupled with a computer readable medium 720. The computer system/server of the server node 114 can typically include a variety of computer system readable media 720. Such media may be any available media that is accessible by computer system/server, and it includes both volatile and non-volatile media, removable and non-removable media.

Computer instructions 707 can be at least partially stored in various locations in the ZK Arbiter 114 server node. For example, the instructions 707 may be stored in the internal memory cache in the one or more processors 702, the main memory 704, the persistent memory 706, and the computer readable medium 720.

The instructions 707 can include computer instructions, data, configuration parameters, and other information that can be used by the at least one processor 702 to perform features and functions of the ZK Arbiter 114 server. According to the present example, the instructions 707 include an assured ZK Arbiter server application 724. The assured ZK Arbiter server application 724 comprises one or more services and applications available in the cloud infrastructure 102. The instructions 707 also include a ZK Arbiter network address translator 726. The instructions 707 include a distributed registry agent 728. Additionally, the instructions 707 include ZK Arbiter configuration data 730.

More specifically, the instructions 707, according to the present example, include a server node network address translator 726. The server node network address translator 726 operates in the particular server node to dynamically configure and translate Internet protocol (IP) addresses that are used to communicate in a communication session with another network node in the social networking system network 102 and that can be used in a communication session with an end user device 118, 120, 122. A similar but complementary network address translator component resides in the other side of the communication session (e.g., another server node or an end user device) to dynamically configure and translate IP addresses used to communicate in the communication session with the particular server node. In this way, the particular server node and the other server node or end user device, as applicably being in the communication session, can anonymously communicate with each other across the network 102 while preventing other devices from "sniffing" the communications on the network 102 and from the IP addresses used in the communications being able to easily identify the end user device and thereby the end user.

Additionally, the instructions 707 according to the present example, include a distributed registry agent 728. The distributed registry agent 728 provides a mechanism at the server node 114 for advertising (publicizing) the various social networking services available from the server node 114. The distributed registry agent 728 allows peer to peer communications with other information processing systems on the network 102 such that other information processing systems may access and connect with the social networking services available at the server node 114.

The at least one processor 702 is communicatively coupled with the assured ZK Arbiter storage 722. can store at least a portion of the ZK Arbiter data, social networking system messages being communicated with the ZK Arbiter, and other related data, for operation of services and applications in the social networking system network 102. At least a portion of the stored information in the assured ZK Arbiter storage 722 may be stored in an encrypted form that would require a cryptographic key to decrypt and render the information usable by an executing application or service in the social networking system. According to various embodiments, information, e.g., social networking system messages, is stored in the assured ZK Arbiter storage 722 and can be at least partially communicated to other server nodes 108, 110, 112, and to one or more end user devices 118, 120, 122, for execution of the social networking system messages at the particular destination server node or end user device as part of the assured verifiable computing operation of the social networking system elements, according to the present example.

While the discussion above referred to the example cloud infrastructure server node embodying an assured ZK Arbiter 114 of FIG. 1, a similar discussion of the cloud infrastructure server node can be applicable to embodying other applications and services executing on server nodes in the social networking system cloud infrastructure 102.

As another example, the server node in various embodiments can embody a Personal Avatar service 108, 110, 112, in the social networking system cloud infrastructure 102. The computer instructions 707 in this example would include the instructions to implement the features and functions of the Personal Avatar service 108, 110, 112.

As a further example, the server node in various embodiments can embody a server side application of the Personal Device service executing on the server node 108, 110, 112, and that communicates and interoperates with the Personal Device application 119, 121, 123, executing on the end user device 118, 120, 122. The computer instructions 707 in this example would include the instructions to implement the features and functions of the server side application of the Personal Device service executing on the server node 108, 110, 112.

Example Use of Verification Messages

The social networking system messages received by an application and/or service (e.g., ZK Arbiter, Personal Avatar, server side Personal Device application), executing at a server node 108, 110, 112, 114, 116, in the social networking system 102 or at a Personal Device application 119, 121, 123, executing on an end user device 118, 120, 122, can be verified with a verification message generated by the respective executing application and/or service to confirm that the social networking system message is being, or has been, executed by the respective executing application and/or service. The verification message can be generated by the respective executing application and/or service at one or more different portions of the overall social networking system message being delivered and executed at the respective executing application and/or service.

For example, one verification message can be generated at the very completion of reception and execution of an entire social networking system message. Alternatively, a verification message can be generated at incremental portions (e.g., chunks) of the reception and execution of the social networking system message, by the respective executing application and/or service. A verification message could even be generated at each packet of downloaded social networking system message being processed at the respective executing application and/or service.

While verification messages can be generated periodically the sender of the social networking system message does not necessarily need to verify the verification message every time generated. Additionally, according to various embodiments, the respective executing application and/or service does not necessarily transmit each verification message to the sender of the social networking system message.

Similarly, sender of the social networking system message does not necessarily need to verify every verification message received from the respective executing application and/or service on the other side of the communication session. Additionally, according to some embodiments, the sender of the social networking system message does not necessarily need to transmit each received verification message to the Personal Device application executing on the end user device.

A verification message can be verified mathematically at a local information processing system that receives the verification message, e.g., at the end user device and/or at the server node 114. Alternatively, the verification message can be verified by the local information processing system transmitting a copy of the verification message to a remote verifying authority across the network 102. The verifying authority would respond with a confirmation message that either affirmatively confirms verification or fails verification.

As long as the verification message(s) continue to be affirmatively verified, the local information processing system recognizes authorized execution of the respective executing application and/or service on the other side of the communication session with the social networking system message being executed thereby. If at any point verification fails, the local information processing system can take appropriate action based on the conditions for the particular social networking system message and the smart contract entered into by the end user.

Example of an End User Device

An end-user device 118, 120, 122, includes one or more processors are communicatively coupled with main memory and persistent memory. A bus architecture communicatively couples the processor with other components of the end user device.

A bus architecture facilitates communication between the various system components in the end user device. The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The processor is communicatively coupled with one or more network interface devices in the end-user device 118, 120, 122. The network interface device is communicatively coupled with the network of the cloud infrastructure 102. The network interface device can communicate with one or more networks such as a local area network (LAN), a general wide area network (WAN), and/or a public network (e.g., the Internet). One or more servers of a social networking system are communicatively coupled with the cloud infrastructure 102. The network interface device is communicatively coupled with a social networking system distributed registry agent in the end-user device 118, 120, 122. The end-user device can communicate with the one or more servers of the social networking system 102 via the network interface device.

The processor is communicatively coupled with a user interface of the end-user device 118, 120, 122. The user interface comprises a user output interface and a user input interface. Examples of elements of the user output interface can include a display, a speaker, one or more indicator lights, one or more transducers that generate audible indicators, and a haptic signal generator. Examples of elements of the user input interface can include a keyboard, a keypad, a mouse, a track pad, a touch pad, a microphone that receives audio signals. The received audio signals, for example, can be converted to electronic digital representation and stored in memory, and optionally can be used with voice recognition software executed by the processor to receive user input data and commands.

The instructions stored in the end-user device 118, 120, 122, include instructions for performing features and functions of a zero knowledge social networking system application. The zero knowledge social networking system application 119, 121, 123, running at the end-user device 118, 120, 122, according to the present example, communicates and interoperates with one or more application programs running on one or more zero knowledge social networking system servers implemented as server side applications executing on the cloud infrastructure social networking system 102. In the present examples discussed herein a Personal Device 118, 120, 122, may be used interchangeably with an end user device. However, in various implementations of a social networking system, the Personal Devices may be implemented with server side application programs executing on one or more servers of the cloud infrastructure 102, which are separate from the application running on the end user device.

The instructions running at the end-user device 118, 120, 122, according to the present example, include configuration parameters for use by the zero knowledge social networking system application. The configuration parameters may be for use by other components of the end user device.

The instructions running at the end-user device 118, 120, 122, according to the present example, include instructions for performing features and functions of an end user network address translator. The end user network address translator operates in the end user device to dynamically configure and translate Internet protocol (IP) addresses that are used to communicate with the social networking system servers. A similar but complementary network address translator component resides in each of the social networking system servers to dynamically configure and translate IP addresses used to communicate with the end user device. In this way, these servers and the end user device can anonymously communicate with each other across the networks of the cloud infrastructure 102 while preventing other devices from "sniffing" the communications on the networks and from the IP addresses used being able to easily identify the end user device.

The cloud infrastructure 102 server side network address translator and the end user device 118, 120, 122, network address translator interoperate to provide IP addresses that can be used by the server and the end-user device 106 to communicate with each other. Additionally, the dynamically configured network address translation prevents other devices on the network 102 from "sniffing" the communications between the server and the end-user device and from the IP addresses used being able to easily identify the end-user device.

Cloud Computer Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
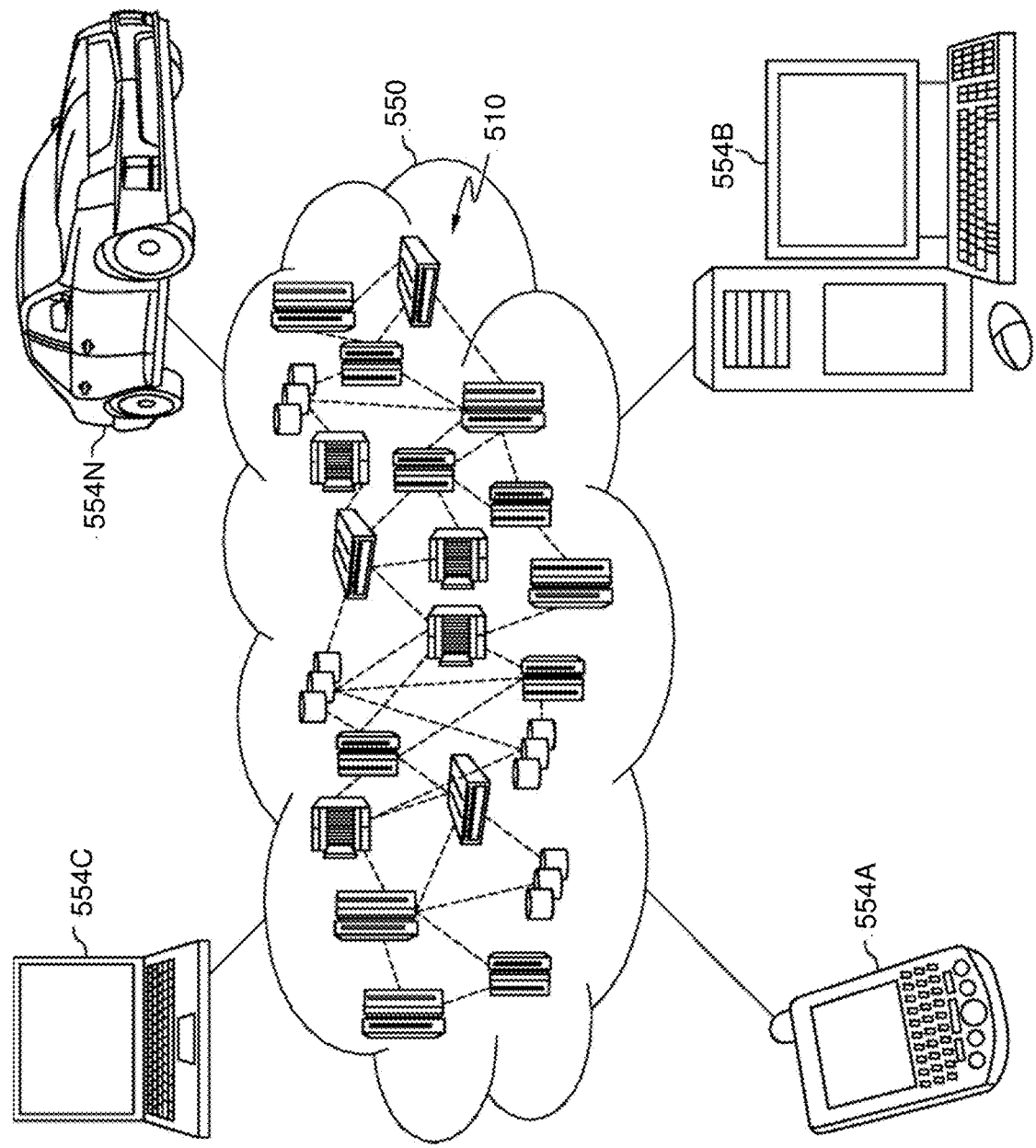
FIG. 5 depicts a cloud computing environment according to an embodiment of the present invention.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
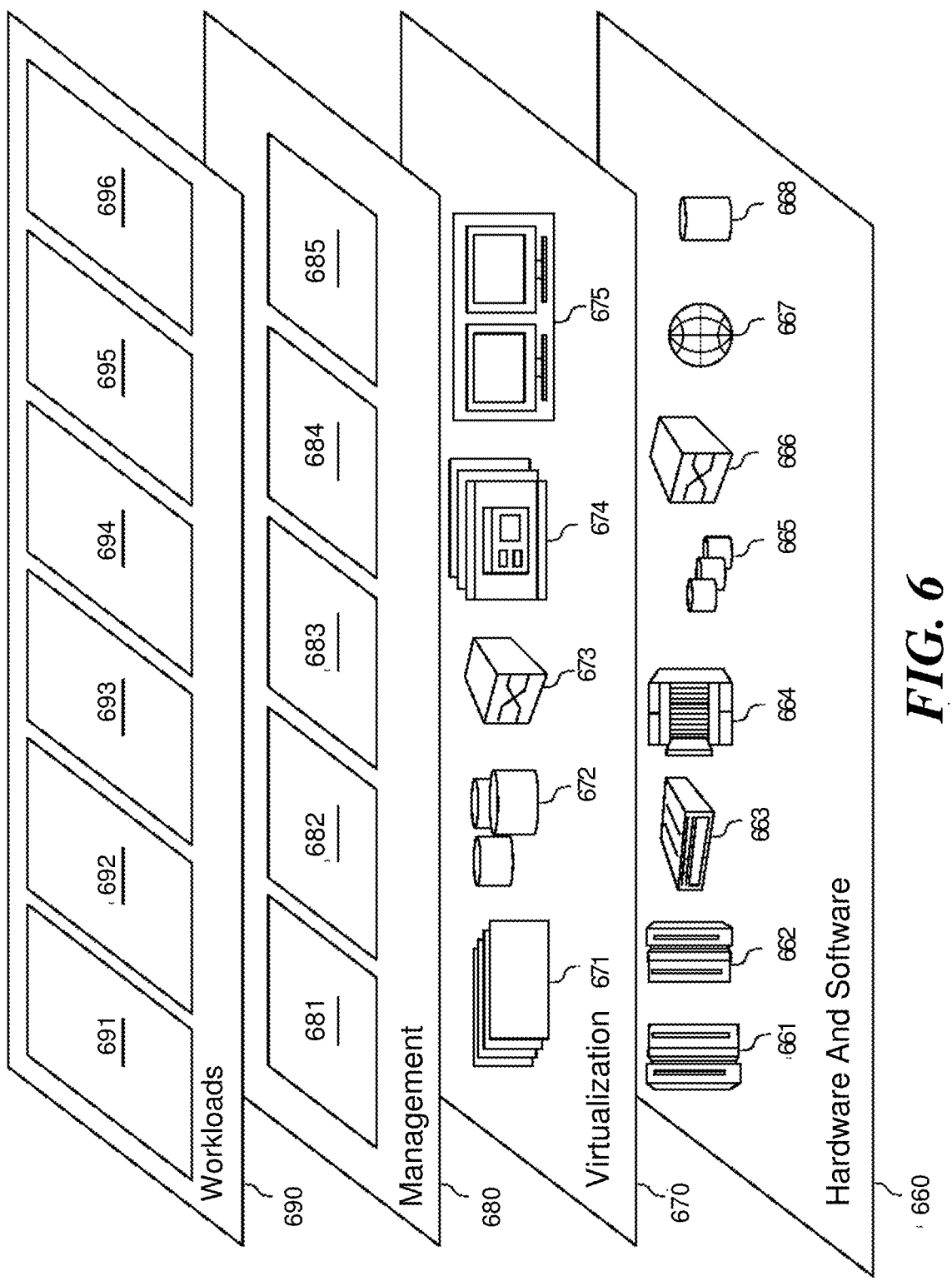
FIG. 6 depicts abstraction model layers according to an embodiment of the present invention.

Referring now to FIG. 6, a set of functional abstraction layers provided by cloud computing environment 550 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and for delivering services, including social networking system message communication services, from a server node 114 operating in zero knowledge to one or more end user devices 118, 120, 122, to ensure communication control and system integrity to social networking system service providers (i.e. reduce piracy and hacking) and to ensure privacy to end users of the social networking system.

According to various embodiments, a cloud service in a social networking system is trusted and does not collect private personal information of individuals (users/persons) while using social networking services of the social networking system. A user/person's personal information is securely maintained on their Personal Device (e.g., in the application running on their end user device) and in their Personal Avatar service that is under the user/person's control.

Example Social Networking System Operations

Figure 2:
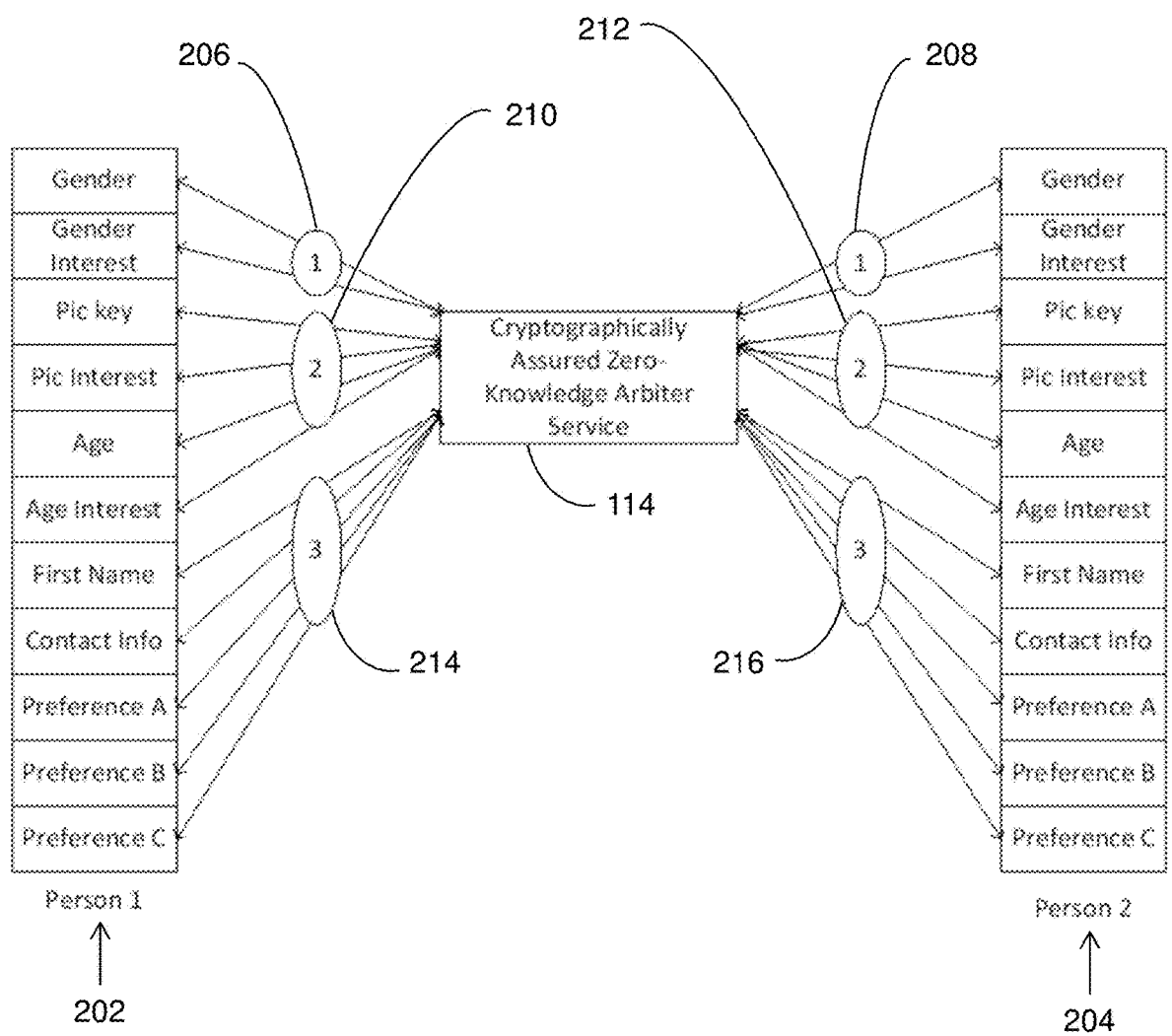
FIG. 2 is a block diagram illustrating an example set of interactions between an assured zero knowledge Arbiter and two zero knowledge Personal Avatars of respective two users of an example social networking system dating service, according to an embodiment of the present invention.

The following example scenario will illustrate an example process that may be performed with a ZK Arbiter, according to an embodiment. This discussion of the example will reference FIGS. 1 and 2.

Alice and Bob each wants to participate in a dating service. Each downloads a dating service (e.g., a Personal Device) application from, for example, the Apple Store or the Google Play store, and installs the dating service Personal Device application into their respective Personal Device. For the example, as shown in FIG. 1, Alice is using the first (end user device) Personal Device 118, while Bob is using the third (end user device) Personal Device 122. The first Personal Device application 119 which is running on Alice's first (end user device) Personal Device 118 establishes a communication session through the Internet, and/or other networks, with at least one cloud services infrastructure that comprises a social networking system dating service 102. The third Personal Device application 123 which is running on Bob's third (end user device) Personal Device 122 establishes a communication session through the Internet, and/or other networks, with at least one cloud services infrastructure that comprises the social networking system dating service 102. For example, and not for limitation, Alice can select Software Cloud Services cloud infrastructure while Bob can select Amazon Cloud Services cloud infrastructure. Optionally, the individual's Personal Device 118, 122, could use a default cloud infrastructure service that is pre-configured with the installed dating service application 119, 123. The respective dating service Personal Device application 119, 123, on the end user device (i.e., in this example also referred to as the Personal Device) 118, 122, communicates with the particularly selected cloud services and instantiates a respective Personal Avatar 108, 112, service for each of Alice and Bob. That is, for example, each social networking system Personal Device application 119, 123, executing on an end user device 118, 122, is in a communication session using a zero knowledge protocol between the social networking system Personal Device application 119, 123, and a respective zero knowledge Personal Avatar 108, 112, executing on the respective server node operating in zero knowledge. A server side zero knowledge Personal Device application service may also be running on the same server node as the respective zero knowledge Personal Avatar 108, 112. The server side zero knowledge Personal Device application service uses zero knowledge verifiable computing to communicate social networking system messages between the server side zero knowledge Personal Device application service and the at least a portion of the social networking system Personal Device application 119, 123, running on the respective end user device 118, 122. As social networking system message are received by the respective server node 108, 112, a response message can be sent to the Personal Device application 119, 123, running on the end user device 118, 122. The response message, according to the example, normally includes an indication of whether the zero knowledge Personal Device application service (and accordingly the respective Personal Avatar 108, 112) has successfully executed the at least a portion of the social networking system message at the respective server node.

Based upon the response message including an indication of a successful execution of the social networking system message at the respective server node (e.g., at the respective Personal Avatar 108, 112), the Personal Device application 119, 123, continues in the communication session between the zero knowledge Personal Device application service running on the respective server node (e.g., at the respective Personal Avatar 108, 112) and the social networking system Personal Device application 119, 123, executing on the end user device 118, 122. If the response message fails to include an indication of a successful execution, the Personal Device application 119, 123, can terminate the communication session as being unsecure and not private. A similar handshake communication protocol in each communication session between server nodes (e.g., between Personal Avatars, between a Personal Avatar and a ZK Arbiter, and the like) that communicate social networking system messages therebetween can maintain security and privacy guaranteed throughout the entire dating service experience for each of Alice and Bob. Privacy for Alice and Bob is ensured with respect to the social networking system 102 and with respect to other end users of the social networking system while Alice and Bob are each using a social networking system Personal Device application 119, 123, executing on their end user device 118, 122. That is, Alice and Bob's privacy is maintained while their social networking system Personal Device application 119, 123, continues in the communication session using a zero knowledge protocol between the social networking system Personal Device application 119, 123, and the respective zero knowledge Personal Avatar 108, 112, executing on a server node operating in zero knowledge.

Those Personal Avatars 108, 112, for Alice and Bob look for a ZK Arbiter 114, 116, on the cloud infrastructure social networking system dating service 102. The ZK Arbiter is a trusted verifiable computing service operating in the cloud infrastructure and that facilitates connections between people (i.e., between Personal Avatars). Each of the ZK Arbiters 114, 116, in this example can perform verifiable computing and can run interactively with the Personal Avatar. Alice's Personal Avatar 108 searches through the Distributed Registry (not shown) and finds that there are other people (i.e., other Personal Avatars) advertising (publicizing) into the social networking system dating service 102. Alice's Personal Avatar 108 also finds one or more ZK Arbiters 114, 116, in the social networking system dating service 102. There may be many people, e.g., thousands of people, and many ZK Arbiters that are participating in the social networking system dating service 102. The advertising (publicizing), according to the example, discloses no other information about the people associated with the particular Personal Avatars, other than possible geographic region they are in.

According to the example, Alice's Personal Avatar 108 searches the Distributed Registry for other people (i.e., other Personal Avatars) participating in the social networking system dating service 102 in the Washington D.C. Metropolitan area. Bob's Personal Avatar 112 is advertised (publicized) in the Distributed Registry that he is a person in the Washington D.C. metropolitan area. Alice's Personal Avatar 108 and Bob's Personal Avatar 112 can initiate a connection (e.g., transmit a connection request) from one Personal Avatar to the other Personal Avatar through the social networking system dating service 102, and suggest to each other that both Personal Avatars 108, 112, attach to a particular's ZK Arbiter 114 in the social networking system dating service 102 to facilitate our connection. They can choose this ZK Arbiter service in different ways as have been discussed above.

The ZK Arbiter enables trusted transactions and communications between un-trusting parties. At this point Alice's Personal Avatar and Bob's Personal Avatar do not trust each other. Each Personal Avatar only trusts the ZK Arbiter that they connect through. Each Personal Avatar initiates a communication session using a zero knowledge protocol with the trusted intermediary ZK Arbiter operating in zero knowledge and using zero knowledge verifiable computing to enforce usage conditions on the social networking system messages communicated in the respective communication sessions with each Personal Avatar. With general reference to FIG. 2, Alice's collection of personal information is represented by a first person 202 while Bob's collection of personal information is represented by a second person 204.

According to the present example, Alice's Personal Avatar 108 and Bob's Personal Avatar 112 each sends a response message containing at least some personal information to the ZK Arbiter 114 in response to one or more requests from the ZK Arbiter 114. For example, Alice's Personal Avatar 108 sends the following response message: "my gender and gender interest are as follows: I am a female interested in males." As another example, Bob's Personal Avatar 112 sends the following response message: "my gender and gender interest are as follows: I am a male interested in females." In response to receiving a previous social networking system message sent from either Alice's Personal Avatar 108 or Bob's Personal Avatar 112, as a further example, the ZK Arbiter 114 sends a response message to the respective Personal Avatar that sent the message. It should be noted that each response message can further include a report of usage of any information (e.g., usage of personal user information of the end user) that is contained in the previously received social networking system message.

Alice through the ZK Arbiter exchanges her basic requested information. For example, in response to a request message from the ZK Arbiter, Alice's Personal Avatar 108 sends a response message containing Alice's first set of information 206 indicating that "my gender and gender interest are as follows: I am a female interested in males." Then, in response to receiving Alice's first set of information 206, the ZK Arbiter sends a response message to confirm the security and integrity of the social networking system messages communication in the communication session. It should be noted again that each response message can further include a report of usage of any information that is contained in the previously received social networking system message (e.g., the ZK Arbiter's use of Alice's personal user information received in the previous social networking system message from Alice's Personal Avatar).

Likewise, in response to a request from the ZK Arbiter, Bob's Personal Avatar 112 sends Bob's first set of information 206 indicating that "my gender and gender interest are as follows: I am a male interested in females." Then, in response to receiving Bob's first set of information 206, the ZK Arbiter sends a response message to confirm the security and integrity of the social networking system messages communication in the communication session. It should be noted again that each response message can further include a report of usage of any information that is contained in the previously received social networking system message (e.g., the ZK Arbiter's use of Bob's personal user information received in the previous social networking system message from Bob's Personal Avatar).

Figure 3:
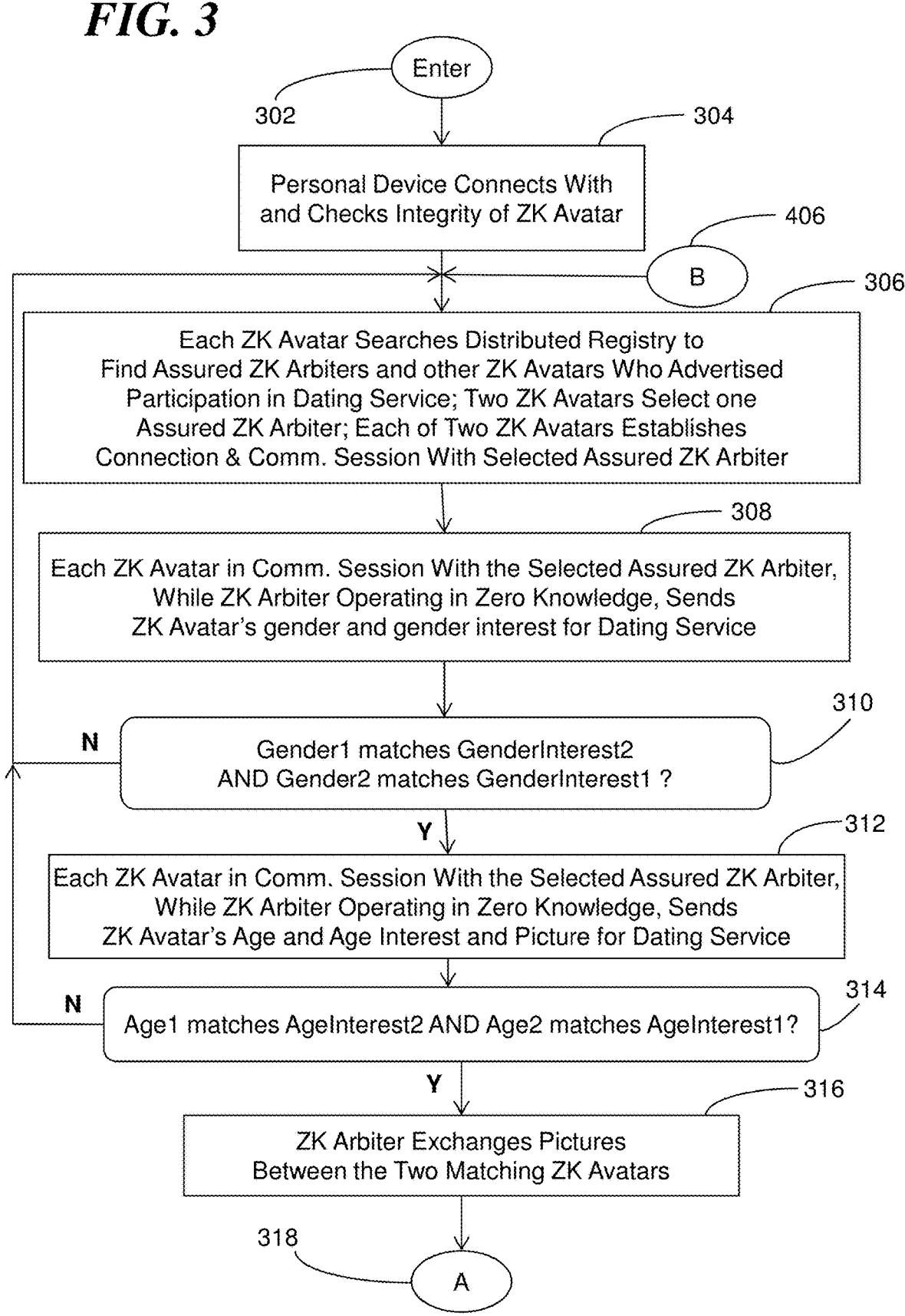
FIGS. 3 and 4 constitute a flow diagram illustrating an example operational sequence for an example social networking system dating service performed with zero knowledge Personal Avatars and at least one assured zero knowledge Arbiter as shown in FIG. 1, according to an embodiment of the present invention.
Figure 4:
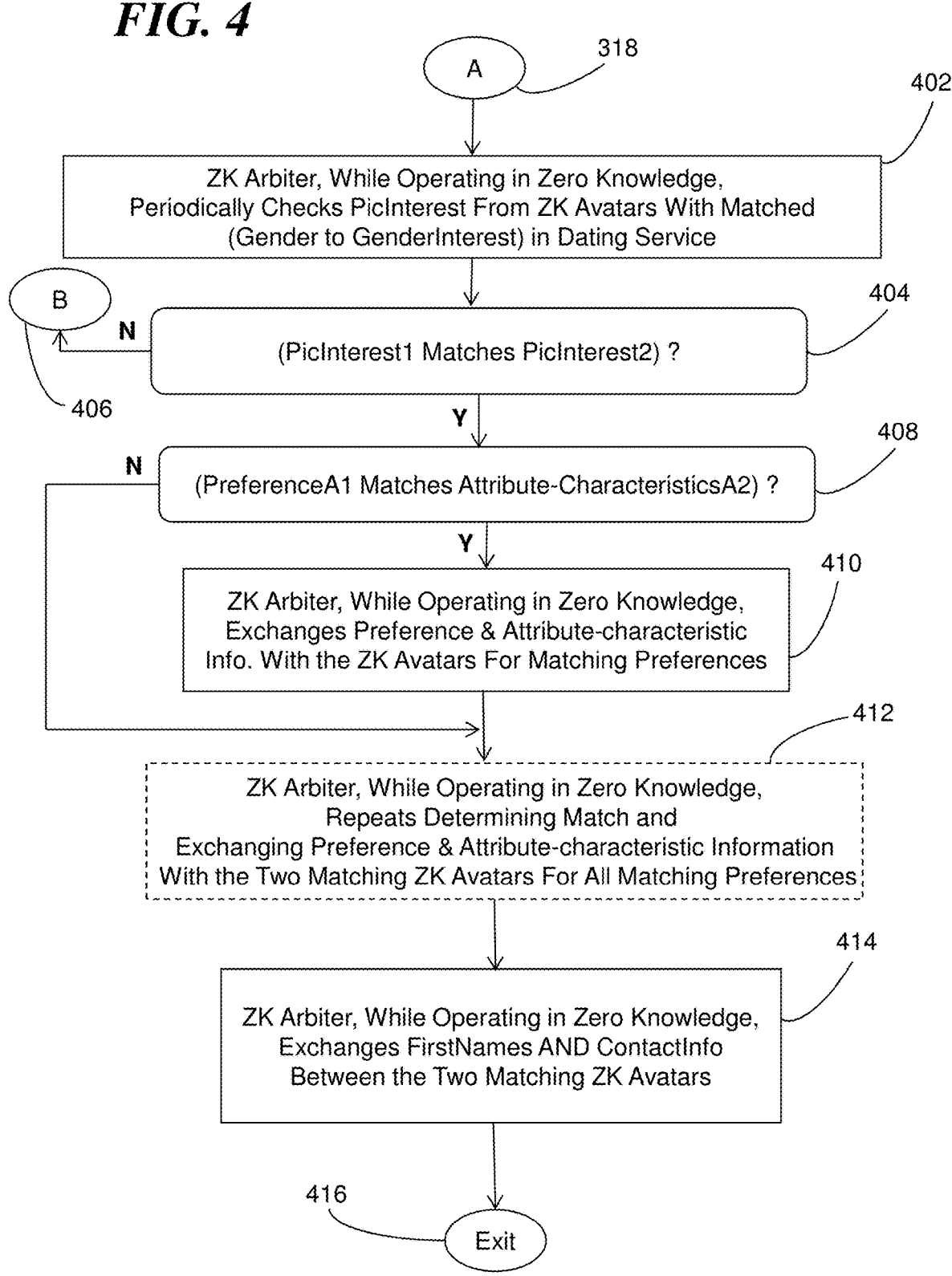

The ZK Arbiter 114 then compares Alice's gender and gender interest to Bob's gender and gender interest and if there is a complete match in genders and gender interests then the ZK Arbiter 114 optionally sends an indication confirming the match found in gender and gender interest information to each other Personal Avatar 108, 112, and proceeds to the next step in the process illustrated in FIGS. 3 and 4. If the genders and gender interests fail to completely match then the ZK Arbiter 114, according to the example, cancels the transaction between Alice's Personal Avatar 108 and Bob's Personal Avatar 112, and then proceeds to search for a new connection with a Personal Avatar.

If a match exists then the ZK Arbiter 114 chooses the next set of personal information 210, 212, to compare for match and if allowed to exchange between Alice's Personal Avatar 108 and Bob's Personal Avatar 112. In this example, the ZK Arbiter 114 requests the person's picture, age, and age interest, from each of the Personal Avatars 108, 112, and exchanges pictures, age, and age interest between the Personal Avatars 108, 112. Then each Personal Avatar 108, 112, shows the received picture, age, and age interest, of the other person to the person using the respective application 119, 121, on the end user device (Personal Device) 118, 122, and asks if they are interested or not in the person in the picture. If one of the persons through their Personal Avatar 108, 112, fails to express interest within a predetermine amount of time then the ZK Arbiter 114, according to the example, cancels the transaction between Alice's Personal Avatar 108 and Bob's Personal Avatar 112, and then proceeds to search for a new connection with a Personal Avatar.

If both persons through their respective Personal Avatars 108, 112, express interest in each other, then the ZK Arbiter 114 proceeds to the next step. The ZK Arbiter 114 requests from each Personal Avatar 108, 112, and in response each Personal Avatar 108, 112, sends a response message, for example, containing their contact information, personal attributes and characteristics of each person, and a set of preferences, 214, 216, to the ZK Arbiter 114. The ZK Arbiter 114 only releases contact information from one Personal Avatar to the other Personal Avatar if all preferences of each person match to attributes or characteristics of the other person, or in certain embodiments if the user/person of a particular Personal Avatar overrides a failed match of a particular preference to allow a complete match of all preferences.

Optionally, according to various embodiments, each Personal Avatar 108, 112, does not send contact information and only passes preferences first to the ZK Arbiter 114. The ZK Arbiter 114 then compares the preferences and attributes or characteristics received from each one of the Personal Avatars 108, 112, to the other one, to see if a complete match exists. If the ZK Arbiter 114 determines that there is a complete match of preferences between both Personal Avatars 108, 112, then the ZK Arbiter 114 requests from each Personal Avatar 108, 112, and in response each sends its person's contact information to the ZK Arbiter 114, to pass along to the other Personal Avatar 108, 112.

An example of a preference is a person's religion, e.g., a person prefers that the other person be Mormon, to allow exchange of contact information between the Personal Avatars 108, 112. A significant value of the ZK Arbiter 114 in these transactions is that it is running stateless and stores no information. At the end of a transaction between two Personal Avatars all temporarily stored information in the ZK Arbiter is flushed before the program executes the final chunk of cryptographically verifiable proof of integrity that it operated correctly.

As another example, assume that Alice is Mormon and she does not want to tell the other person (e.g., Bob) she is Mormon unless the other Personal Avatar 108, 112, indicates that the other person is also Mormon. The ZK Arbiter 114 is a trusted intermediary that can discretely compare each person's preferences to the other person's characteristics or attributes, and can determine if all conditions on preferences are satisfied before allowing further disclosure of personal information (e.g., contact information) to the other Personal Avatar 108, 112. In certain embodiments, personal information of each party that does not match the other party's criteria (e.g., conditions on preferences) will not be passed along by the ZK Arbiter 114 to the other person's Personal Avatar 108, 112.

Other examples of preferences may include being a member of an association or affinity group, other personal attributes, occupation, income level, etc. According to various embodiments, all of these personal attributes and characteristics of each person can be required to be specified by each participating person in a social networking system dating service such that other persons participating in the dating service can set conditions on preferences for matching such attributes and characteristics.

In some embodiments, a social networking system dating service can allow for special preferences and conditions on such preferences, even if not normally specified for every participant in the social networking system dating service. In such a case, when the ZK Arbiter 114 receives from a Personal Avatar 108, 112, a special preference for a special attribute or characteristics not previously specified by the other person, then the ZK Arbiter 114 can send a request for such special attribute or characteristic information from the other person through their Personal Avatar 108, 112. This can be managed discretely through the ZK Arbiter 114 such that a failed match in such special preference could terminate the transaction between the two Personal Avatars 108, 112, and al information is flushed from the ZK Arbiter before the program executes the final chunk of cryptographically verifiable proof of integrity that it operated correctly. In such a case, the two persons will remain anonymous relative to each other and relative to the social networking system dating service.

If the other person through their Personal Avatar 108, 112, responds with the special attribute or characteristic matching the special preference, then the ZK Arbiter 114 discretely passes along confirmation of a match in the special attribute or characteristics of the other person to that special preference through their Personal Avatars 108, 112. If the other person does not respond with the special attribute or characteristic of that person matching the special preference then the ZK Arbiter 114 keeps that information private from the other Personal Avatar 108, 112. The ZK Arbiter 114, as a trusted intermediary, is trusted to only pass along personal information that meets both of the person's criteria.

The ZK Arbiter guarantees zero knowledge and stateless operation and flushes the information from memory once it is done being the intermediary between the two Personal Avatars. As soon as the session is done the ZK Arbiter flushes the information from its memory before the program executes the final chunk of cryptographically verifiable proof of integrity that it operated correctly. The ZK Arbiter runs according to a simple set of rules that maintains parity between the two sides, i.e., the two Personal Avatars. It does not let the information exchange between the Personal Avatars get lopsided by having one person reveal more information to the other person than vice versa.

Optionally, the ZK Arbiter allows interactivity with each user/person, through their Personal Avatar. For example, the ZK Arbiter can allow the user/person to override the preferences restriction (i.e., that all preferences must match) before disclosing personal contact information to the other person. The ZK Arbiter can be permitted to share contact information, for example, with the other person upon the user/person's override permission. That is, the person that has a preference that doesn't match the other person's attributes or characteristics has an opportunity to select to override and allow sharing of their personal contact information even if a preference does not match the other person's attributes or characteristics.

This override may be desirable to a particular user/person for example because the nonmatching preference is not that critical to the particular person. For example, a person may have the preference of meeting only black-haired people. However, during the transactions managed by the ZK Arbiter between the two Personal Avatars that person can override the preference and allow their contact information, for example, be disclosed by the ZK Arbiter to the other person (the other Personal Avatar) if that other person has red hair.

Figure 8:
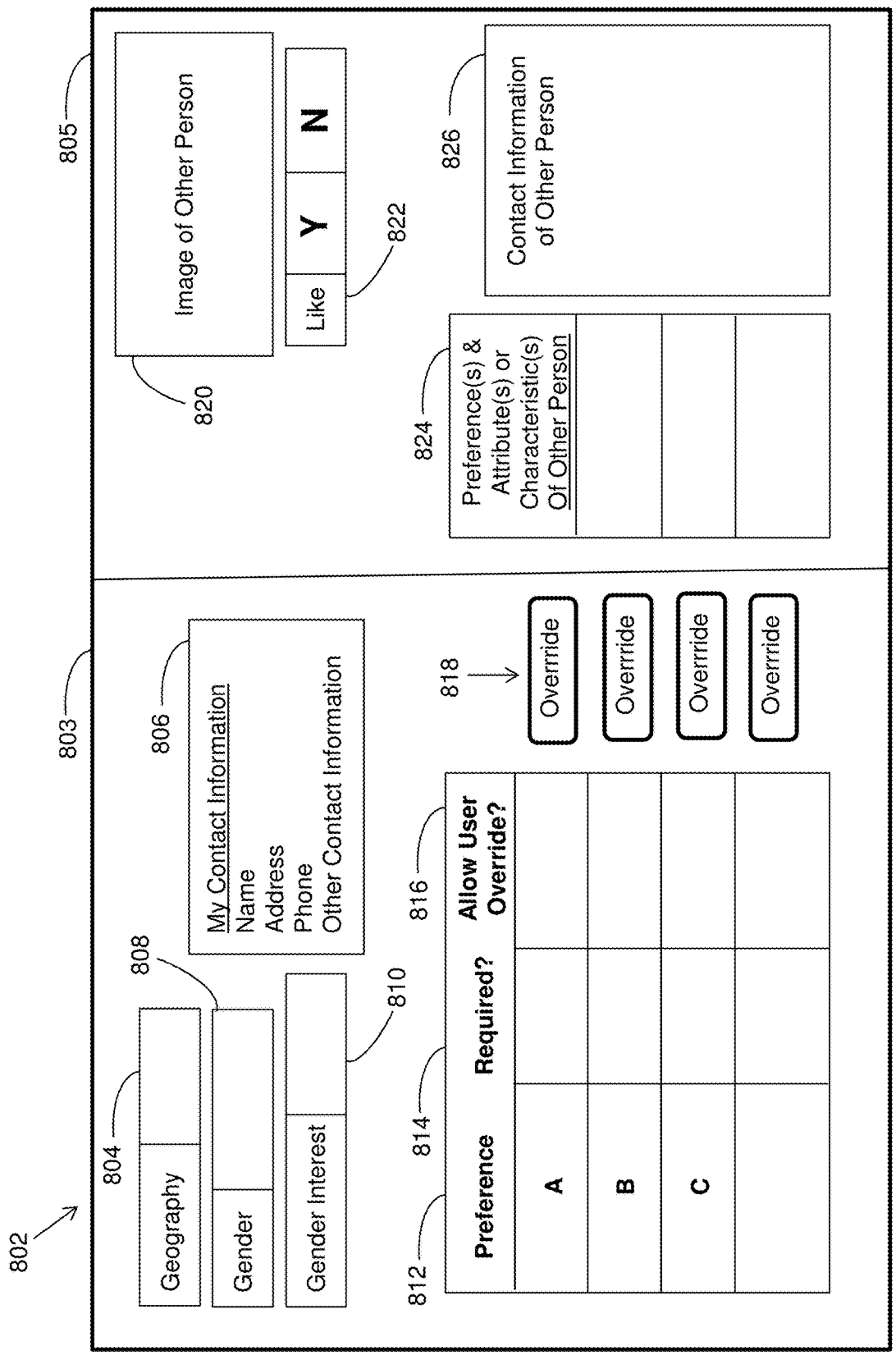
FIG. 8 is an example user interface at a user's personal device communicatively coupled with a zero knowledge Personal Avatar operating in a social networking system dating service, according to an embodiment of the present invention.

In view of the discussion above, with reference now to FIG. 8, the example user interface 802 of an application running on one of the end-user devices (Personal Devices) illustrates how the user/person can specify whether to allow override on certain non-matching preferences. The left side 803 of the displayed page on the user interface 802 pertains to the user of the particular and user device while the right side 805 of the user interface 802 pertains to the other person using the other Personal Avatar. The user's contact information is filled in to the fields in the displayed contact information record 806. Contact information may include name address phone and other information. The geography of that person 804 is entered into a displayed field, the gender of that person is displayed in a gender field 808, and a gender interest is displayed in a gender interest field a 10 as shown.

Additional preferences are shown in the preferences column 812 which are indicated as A, B, and C. The required column 814 accepts entries for each of the preferences to indicate whether the user requires that preference of the other person. A yes entered into the respective required column 814 for a preference shown in a 812 will require that preference be a match before the ZK Arbiter may disclose contact information to the other person. A column labeled allow user override 816 permits the user to click on the associated override button 818 to allow disclosure of contact information to the other person even if that particular preference does not match.

According to various embodiments, after all the preferences criteria matches between the two persons (Personal Avatars) similar to the process described above, the right side 805 of the user interface 802 is filled with the information from the other person. For example, the image of the other person is displayed in the upper right field 820. The user of the end user device (Personal Device) 118, 122, can select whether they like 822 the image of the other person as displayed in the picture field 820 by clicking on either the Y for yes or the N for no in the Like field 822. The preferences and the attributes and characteristics of the other person can be shown in a set of fields 824. Also, personal contact information of the other person can be displayed in the contact information field 826.

It should be noted that, according to some embodiments, a match of a person's particular attributes or characteristics to a certain preference of the other person is not necessarily required (i.e., by entering a No in the required preference field 814) by the other person. In such a case, the ZK Arbiter 114 will share this particular attribute or characteristic information of the person with the other person (the other Personal Avatar) as long as all other preferences criteria and requirements are met between the two Personal Avatars 108, 112.

In various implementations of a social networking system dating service 102, a Personal Avatar 108, 112, will not have to run as an assured verified program with respect to the ZK Arbiter 114. The Personal Avatars 108, 112, normally don't have to prove themselves to the ZK Arbiter 114. That is, they don't normally need to be trusted by the ZK Arbiter 114. However, in some embodiments the Personal Avatars 108, 112, can be required to prove themselves to the ZK Arbiter 114. This enhances overall security of the social networking system dating service 102.

The ZK Arbiter 114, on the other, being the trusted intermediary of transactions between two Personal Avatars 108, 112, normally should run as an assured verified program. The ZK Arbiter 114 normally should prove itself as a trusted and verified program to the two Personal Avatars 108, 112.

In some embodiments, the Personal Devices 118, 122, may not need the respective Personal Avatars 108, 112, to run as an assured Personal Avatar program. In other embodiments, the Personal Avatars 108, 112, can be required to assure and prove themselves as verified programs to the Personal Devices 118, 122.

In one embodiment, for example, a user of an end user device (Personal Device) 118 can require a Personal Avatar 108 to run as an assured Personal Avatar program on a server in the cloud infrastructure with the additional computation overhead, and possible added costs, required and thereby have assurance that no one accessing the cloud would run this Personal Avatar other than the user. In a second embodiment, a user may permit the Personal Avatar to run unassured (without being assured) which requires less computing overhead, and reduced operating costs, and accordingly the user would pay less money for the service. The Personal Avatar can run assured and verified or unassured an unverified depending on particular embodiments.

The Personal Avatar, according to various embodiments, comprises a persistent application program executing on one or more servers in the cloud even if the user/person is not executing the associated application on their end user device (e.g., Personal Device). The Personal Avatar continually looks for potential connections with other Personal Avatars and makes connections for the user/person so that the next time that the user/person opens the application on their end user device the application offers to the user/person the potential connections to the other Personal Avatars.

Referring now to FIGS. 3 and 4, an operational sequence is entered, at step 302, and the Personal Device proceeds to connect with and check the integrity of the ZK Avatar, at step 304. Each of the ZK Personal Avatars searches the Distributed Registry to find one or more Assured ZK Arbiters and other ZK Personal Avatars who advertise (publicize) as participating in the social networking system dating service. Two ZK Personal Avatars select one another, and select one Assured ZK Arbiter for shared discrete communication between the two ZK Personal Avatars. Each of the two ZK Personal Avatars establishes a communication session with the selected assured ZK Arbiter, at step 306. Each of the ZK Personal Avatars is in a communication session with the selected shared assured ZK Arbiter, at step 308, while the ZK Arbiter operates in zero knowledge. Each ZK Personal Avatar sends its respective person's gender and gender interest used in the dating service, to the ZK Arbiter, at step 308.

If the gender of the first person matches the gender interest of the second person and the gender of the second person matches the gender interest of the first person, at step 310, then the ZK Arbiter forwards confirmation between the two ZK Personal Avatars that their genders and gender interests match. However, if their genders and gender interests failed to match, at step 310, then the process returns to step 306 where each as ZK Personal Avatar searches for other ZK Personal Avatars and assured ZK Arbiters advertising (publicizing) in the dating service.

Following a determination that the genders and gender interests match, at step 310, while the ZK Arbiter continues to operate in zero knowledge, the ZK Arbiter requests from each ZK Personal Avatar and each ZK Personal Avatar sends its respective person's age, age interest, and picture, at step 312. If the age and age interest of both ZK Personal Avatars fails to match, at step 314, the process returns to step 306.

If however the age and age interest of both ZK Personal Avatars match, at step 314, the ZK Arbiter, at step 316, exchanges between the ZK Personal Avatars the persons picture and confirmation that the age and age interest of both ZK Personal Avatars matches. The ZK Arbiter then proceeds, at steps 318, 402, to periodically check for a response from each of the two ZK Personal Avatars that there is an interest in the other person's picture.

If the picture interest of both ZK Personal Avatars matches, at step 404, then the ZK Arbiter proceeds, at step 408, to compare preferences of the two ZK Personal Avatars. However, if the picture interest of both ZK Personal Avatars does not match, at step 404, then the process returns, at steps 406, 306, where each as ZK Personal Avatar searches for other ZK Personal Avatars and assured ZK Arbiters advertising (publicizing) in the dating service.

If the picture interest of both ZK Personal Avatars matches, at step 404, then at steps 408, 410, 412, the ZK Arbiter repeatedly compares each and every preference of each ZK Personal Avatar to the given attributes or characteristics of the other ZK Personal Avatar to determine whether each and every preference of one ZK Personal Avatar matches an attribute or characteristic of the other ZK Personal Avatar.

If any of the preferences of one ZK Personal Avatar fails to match an attribute or characteristic of the other ZK Personal Avatar then the ZK Arbiter, according to the example, notifies both ZK Personal Avatars that a particular preference failed to match. Additionally, with reference to FIG. 8, if the particular ZK Personal Avatar with the nonmatching preference is pre-configured (e.g., by the user/person having set a flag 816 to Yes in a preferences table 812) to provide an opportunity for the user/person to override the nonmatching preference, then the ZK Arbiter monitors for a predetermined amount of time for a response from the particular ZK Personal Avatar. This predetermined amount of time allows the user/person of the particular ZK Personal Avatar to select an override button 818 associated with the nonmatching preference on a user interface 802.

If the user selects the respective override button 818 the ZK Personal Avatar sends the override instruction to the ZK Arbiter such that the particular preference, even if it does not match, these ZK Arbiter can continue to match all other preferences between the two ZK Personal Avatars. Of course, if within the predetermined amount of time the user/person does not select the override button 818, or if override is not allowed by the flag 816 set to No in the preferences table 812, then the process returns to step 306 where each ZK Personal Avatar searches for other ZK Personal Avatars and assured ZK Arbiters advertising (publicizing) in the dating service.

If all preferences match, and any nonmatching preferences are overrided by the user/person, then these ZK Arbiter exchanges, at step 414, the persons names and contact information between the two ZK Personal Avatars. The operational sequence then exits, at step 416.

Non-Limiting Examples

The present invention may comprise a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer readable program instructions described herein can be downloaded to respective computing/processing devices from a computer readable storage medium or to an external computer or external storage device via a network or networks, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flow diagram illustrations and/or block diagrams of methods, apparatus (systems), and computer program products according to embodiments of the invention. It will be understood that each block of the flow diagram illustrations and/or block functional diagrams, and combinations of blocks in the flow diagram illustrations and/or block functional diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagrams and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow diagram and/or functional block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow diagram and/or block diagram block or blocks.

The flow diagram and block diagrams in the Figures illustrate the architecture, functionality, and operation of possible implementations of systems, methods, and computer program products according to various embodiments of the present invention. In this regard, each block in a flow diagram or block diagram may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present disclosure can further incorporate interfaces that each includes separate, fully programmed microprocessors that are used to off-load processing from the processor. An operating system (not shown) included in main memory for the information processing system may be a suitable multitasking and/or multiprocessing operating system, such as, but not limited to, any of the Linux, UNIX, Windows, and Windows Server based operating systems. Various embodiments of the present disclosure are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed.

The description of the present application has been presented for purposes of illustration and description, but is not intended to be exhaustive or limited to the invention in the form disclosed. Many modifications and variations will be apparent to those of ordinary skill in the art without departing from the scope of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method for providing a zero knowledge social networking system using zero knowledge verifiable computing to ensure privacy for each of a plurality participants using end user devices, the method comprising:

running, by at least one server node in a zero knowledge social networking system, a plurality of arbiters;

receiving, by the at least one server node, a request from a first mobile device to create a first avatar, and creating, by the at least one server node, based on the received request from the first mobile device, the first avatar;

receiving, by the at least one server node, a request from a second mobile device to create a second avatar, and creating, by the at least one server node, based on the received request from the second mobile device, the second avatar;

running, by the at least one server node, the first avatar, and running, by the at least one server node, the second avatar;

receiving, by the second avatar, a connection request, from the first avatar;

selecting, by the second avatar, one of the plurality of arbiters running on the at least one server node;

sending, by the second avatar, information of the selected arbiter to the first avatar;

verifying, by the first avatar, integrity of the selected arbiter using zero knowledge proofs;

based on the verifying integrity of the selected arbiter, sending to the selected arbiter, by the first avatar, a first portion of first avatar user information, and sending, by the second avatar, to the selected arbiter a first portion of second avatar user information;

receiving, by the selected arbiter, the first portion of the first avatar user information and the first portion of the second avatar user information;

comparing, by the selected arbiter, the first portion of the first avatar user information and the first portion of the second avatar user information;

determining, by the selected arbiter, that there is a first match based on the comparing of the first portion;

based on the determination of the first match, requesting and receiving, by the selected arbiter, a second portion of the first avatar user information from the first avatar, and a second portion of the second avatar user information from the second avatar;

sending, by the selected arbiter, the second portion of the first avatar user information to the second avatar, and the second portion of the second avatar user information to the first avatar;

displaying, by the first avatar, the second portion of the second avatar user information on the first mobile device, and displaying, by the second avatar, the second portion of the first avatar user information on the second mobile device;

receiving, by the selected arbiter, a third portion of the first avatar user information from the first avatar, and a third portion of the second avatar user information from the second avatar;

comparing, by the selected arbiter, the third portion of the first avatar user information and the third portion of the second avatar user information;

determining, by the selected arbiter, that there is a second match based on the comparing of the third portion;

based on the determination of the second match, requesting and receiving within a time threshold, by the selected arbiter, first contact information from the first avatar and second contact information from the second avatar; and sending, by the selected arbiter based on the receiving within the time threshold, the first contact information to the second avatar, and the second contact information to the first avatar, for social networking message exchange.

2. The computer-based method of claim 1, further including:

receiving, by the at least one server node via the first avatar, a payment from the first mobile device; and sending, by the at least one server node, the received payment to a social networking system service provider.

3. The computer-based method of claim 2, wherein the receiving the payment further includes receiving a cryptocurrency as payment.

4. The computer based method of claim 1, wherein the verifying, by the first avatar, integrity of the selected arbiter using zero knowledge proofs comprises verifying, by the first avatar, integrity of the selected arbiter via a a succinct computational integrity and privacy (SCIP) technique.

5. The computer based method of claim 1, wherein the verifying, by the first avatar, integrity of the selected arbiter using zero knowledge proofs comprises verifying, by the first avatar, integrity of the selected arbiter via a zero knowledge Succinct non-interactive argument of knowledge (zk-snark) technique.

6. The computer based method of claim 1, wherein the verifying, by the first avatar, integrity of the selected arbiter using zero knowledge proofs comprises verifying, by the first avatar, integrity of the selected arbiter via a probabilistically checkable proof (PCP) technique.

7. The computer based method of claim 1, wherein the at least one server node comprises a distributed registry, and further comprising:

publishing, by the at least one server node, via the distributed registry a plurality of arbiters and avatars.

\* \* \* \* \*